US012637898B2

(12) United States Patent
Roes

(10) Patent No.: US 12,637,898 B2
(45) Date of Patent: May 26, 2026

(54) INSULATING GLAZING COMPRISING A SPACER HAVING A REINFORCING PROFILE

(71) Applicant: SAINT-GOBAIN GLASS FRANCE, Courbevoie (FR)

(72) Inventor: Karl-Theo Roes, Düsseldorf (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 405 days.

(21) Appl. No.: 17/921,266

(22) PCT Filed: Jun. 11, 2021

(86) PCT No.: PCT/EP2021/065811
§ 371 (c)(1),
(2) Date: Oct. 25, 2022

(87) PCT Pub. No.: WO2021/259676
PCT Pub. Date: Dec. 30, 2021

(65) Prior Publication Data

US 2023/0175314 A1 Jun. 8, 2023

(30) Foreign Application Priority Data

Jun. 22, 2020 (EP) .................................... 20181383

(51) Int. Cl.
*E06B 3/66* (2006.01)
*E06B 3/663* (2006.01)
*E06B 3/673* (2006.01)

(52) U.S. Cl.
CPC ...... *E06B 3/66333* (2013.01); *E06B 3/66319* (2013.01); *E06B 3/66352* (2013.01); *E06B 3/67326* (2013.01)

(58) Field of Classification Search
CPC .................... E06B 2003/66338–66395; E06B 3/66309–66371
See application file for complete search history.

(56) References Cited

U.S. PATENT DOCUMENTS 5,260,112 A * 11/1993 Grether ............... E06B 3/66319 52/786.13
5,806,272 A * 9/1998 Lafond ............... E06B 3/66328 52/786.13

(Continued)

FOREIGN PATENT DOCUMENTS

DE 40 24 697 A1 2/1992
EP 0 470 373 A1 2/1992

(Continued)

OTHER PUBLICATIONS

Machine translation of JP 2020/200220 A.*

(Continued)

*Primary Examiner* — Z. Jim Yang
(74) *Attorney, Agent, or Firm* — CUSHMAN PARTNERS, LLC

(57) ABSTRACT

An insulating glazing includes first and second panes, a spacer, a glazing interior, and an outer interpane space. The first pane is attached to a first pane contact surface and a first side surface of the spacer, the second pane is attached to a second pane contact surface and a second side surface of the spacer, the spacer includes a polymeric main body and a reinforcing profile including an inner face, an outer face, and two side surfaces, the inner face of the reinforcing profile is materially joined at least in some sections to the outer surface of the polymeric body and the width of the reinforcing profile is less than or equal to the width of the polymeric body, and no outer seal is introduced into the outer interpane space, and the outer face of the reinforcing (Continued)

Figure 1A:
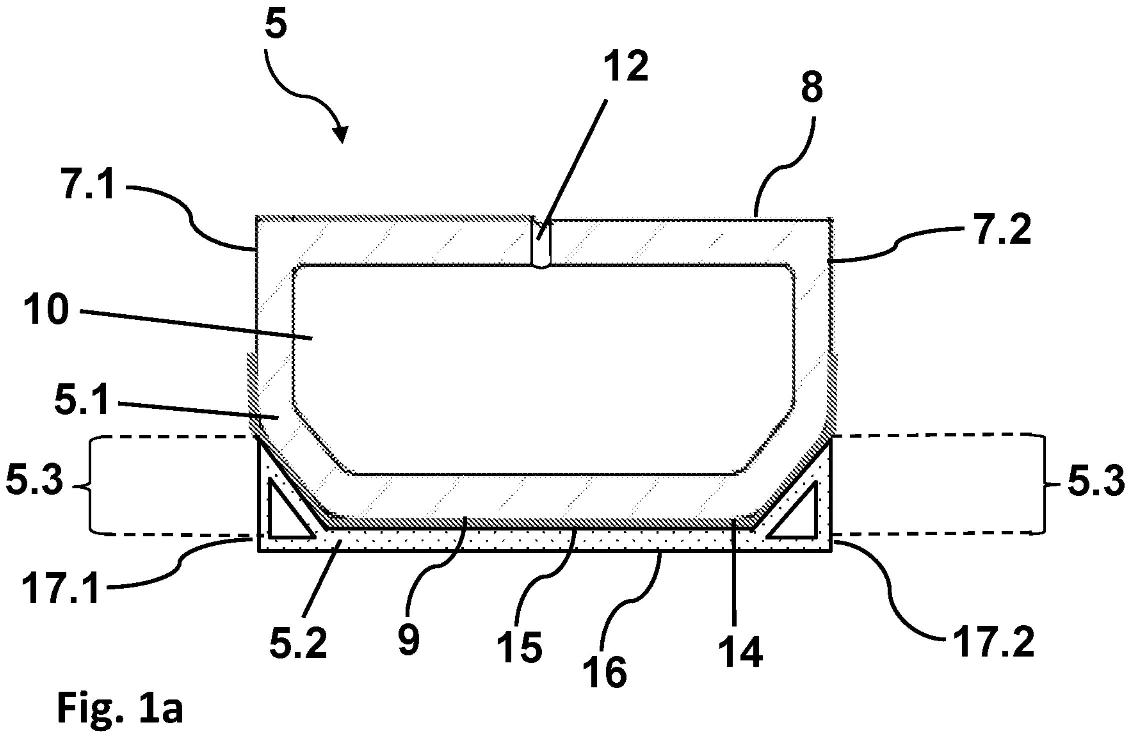

profile is an exposed surface of the insulating glazing facing the surroundings.

20 Claims, 4 Drawing Sheets

(56) References Cited

U.S. PATENT DOCUMENTS

| | | | | |
|---|---|---|---|---|
| 6,339,909 | B1 * | 1/2002 | Brunnhofer | E06B 3/66319 52/786.13 |
| 6,389,779 | B1 * | 5/2002 | Brunnhofer | E06B 3/66319 52/786.13 |
| 6,401,428 | B1 * | 6/2002 | Glover | E06B 3/24 52/786.13 |
| 2004/0020162 | A1 * | 2/2004 | Baratuci | E06B 3/66309 52/786.13 |
| 2005/0100691 | A1 | 5/2005 | Bunnhofer et al. | |
| 2007/0175120 | A1 * | 8/2007 | Lenhardt | E06B 3/66361 428/34 |
| 2010/0011703 | A1 * | 1/2010 | Seele | E06B 3/663 52/786.1 |
| 2012/0297707 | A1 * | 11/2012 | Lenz | E06B 3/66347 52/204.593 |
| 2012/0297708 | A1 * | 11/2012 | Brunnhofer | E06B 3/66319 52/309.1 |
| 2017/0016271 | A1 * | 1/2017 | Boucher | E06B 3/6715 |
| 2017/0152701 | A1 * | 6/2017 | Kuster | E06B 3/67339 |
| 2017/0298680 | A1 * | 10/2017 | Schreiber | E06B 3/66333 |
| 2019/0090660 | A1 * | 3/2019 | Baquet | E06B 3/66333 |
| 2019/0284865 | A1 * | 9/2019 | Bouesnard | E06B 3/67343 |
| 2020/0141178 | A1 * | 5/2020 | Natrajan | E06B 3/67326 |
| 2020/0300029 | A1 * | 9/2020 | Hervieux | E06B 3/66352 |
| 2020/0340292 | A1 * | 10/2020 | Ettridge | E06B 3/66328 |
| 2021/0172242 | A1 * | 6/2021 | Schreiber | E06B 3/67326 |
| 2021/0372195 | A1 * | 12/2021 | Sommer | E06B 3/66319 |
| 2021/0388666 | A1 * | 12/2021 | Meinardi | E06B 3/66342 |
| 2022/0074259 | A1 * | 3/2022 | Morin | E06B 3/66333 |
| 2022/0259916 | A1 * | 8/2022 | Hirschler | B32B 3/02 |
| 2023/0015006 | A1 * | 1/2023 | Lazebnikov | E06B 3/5427 |

FOREIGN PATENT DOCUMENTS

| | | | | | |
|---|---|---|---|---|---|
| EP | 0 852 280 | A1 | | 7/1998 | |
| EP | 3214252 | A1 | * | 9/2017 | E06B 3/667 |
| EP | 3201414 | B1 | * | 7/2019 | E06B 3/025 |
| IT | UA20163892 | A1 | | 11/2017 | |
| JP | H04-243942 | A | | 9/1992 | |
| JP | 6419168 | B2 | | 11/2018 | |
| JP | 6479172 | B2 | | 3/2019 | |
| JP | 2020200220 | A | * | 12/2020 | |
| KR | 10-2016-0095129 | A | | 8/2016 | |
| KR | 10-2019-0057430 | A | | 5/2019 | |
| WO | WO 2013/104507 | A1 | | 7/2013 | |
| WO | WO 2015/086459 | A1 | | 6/2015 | |
| WO | WO 2016/046081 | A1 | | 3/2016 | |
| WO | WO-2016050839 | A1 | * | 4/2016 | E06B 3/025 |
| WO | WO-2016121332 | A1 | * | 8/2016 | E06B 3/66 |
| WO | WO-2018054655 | A1 | * | 3/2018 | E06B 3/025 |
| WO | WO 2019/110409 | A1 | | 6/2019 | |
| WO | WO 2019/201530 | A1 | | 10/2019 | |

OTHER PUBLICATIONS

Machine translation of WO 2016/121332 A1.*
International Search Report as issued in International Patent Application No. PCT/EP2021/065811, dated Oct. 8, 2021.

* cited by examiner

INSULATING GLAZING COMPRISING A SPACER HAVING A REINFORCING PROFILE

CROSS-REFERENCE TO RELATED APPLICATIONS

This application is the U.S. National Stage of PCT/EP2021/065811, filed Jun. 11, 2021, which in turn claims priority to European patent application number 20181383.9 filed Jun. 22, 2020. The content of these applications are incorporated herein by reference in their entireties.

The invention relates to an insulating glazing with a spacer having a reinforcing profile, a method for its production, and its use.

The thermal conductivity of glass is lower by roughly a factor of 2 to 3 than that of concrete or similar building materials. However, since, in most cases, panes are designed significantly thinner than comparable elements made of brick or concrete, buildings frequently lose the greatest share of heat via external glazing. This effect is particularly significant in high-rise buildings with partial or complete glass façades. The increased costs necessary for heating and air-conditioning systems make up a part of the maintenance costs of a building that must not be underestimated. Moreover, as a consequence of more stringent construction regulations, lower carbon dioxide emissions are required. An important approach to a solution for this involves insulating glazings, without which, primarily as a result of increasingly rapidly rising prices of raw materials and more stringent environmental protection constraints, it is no longer possible to imagine the building construction sector.

Insulating glazings are manufactured from at least two panes that are joined to one another via at least one circumferential spacer. Depending on the design, the interpane space between the two panes, referred to as the "glazing interior", is filled with air or gas, but in any case is free of moisture. An excessive moisture content in the interpane space of the glazing results, in particular in the case of cold exterior temperatures, in the condensation of drops of water in the interpane space, which absolutely must be avoided. To absorb the residual moisture remaining in the system after assembly, hollow body spacers filled with a desiccant can, for example, be used. However, since the absorption capacity of the desiccant is limited, even in this case, the sealing of the system is of enormous importance to prevent the penetration of additional moisture. In the case of gas-filled insulating glazings, into whose glazing interior an argon filling, for example, is introduced, gas tightness must also be ensured.

In order to ensure improved leak tightness of insulating glazings, a wide variety of modifications in the field of the spacers are already known. Already in DE 40 24 697 A1, the problem is discussed that the customary single or double sealed insulating glass edge bonds made of materials such as polysulfide polymers, butyl hot melt, silicone rubber, polymercaptan, or polyurethane cannot ensure adequate long-term sealing and, over time, an undesirable gas exchange between the glazing interior and the surroundings occurs. Improved sealing is accomplished according to DE 40 24 697 A1 by means of a modification of the spacer, onto whose pane contact surfaces polyvinylidene chloride films or coatings are applied.

Another measure for improving the leak tightness of insulating glazings is the coating of polymeric spacers with metal foils or alternating metal polymer layer systems, as disclosed, for example, in EP 0 852 280 A1 and WO 2013/104507 A1. These barrier films ensure high leak tightness of the spacer. Adjacent the spacer with a barrier film, there is generally a primary sealant that serves to bond the spacer to the adjacent panes of the insulating glazing. This primary sealant is water- and gas-impermeable. An outer seal in the form of a secondary sealant is introduced into the outer interpane space adjacent the spacer with the primary sealant. The outer sealing of the insulating glazing is done with materials such as silicone or polysulfide, which have very good adhesion properties but are water- and gas-permeable. The secondary sealant thus serves primarily for the mechanical stability of the glazing.

EP 0 470 373 A1 discloses an insulating glazing with a hollow profile spacer, wherein a metal strip is applied to the outer face of the spacer. Metallic reinforcement elements that are attached in the corner region of a polymeric spacer are known from IT UA20 163 892 A1. WO 2019/201530 A1 discloses metallic reinforcement elements of a polymeric spacer, wherein they are inserted flush into indentations of the spacer. In the installed state of these spacers with reinforcement elements in an insulating glazing, a secondary sealant is introduced on the outer face of the spacers in the outer interpane space in order to achieve adequate mechanical stability of the insulating glazing.

The sealing system described, consisting of spacer, primary sealant, and secondary sealant has to be attached in the insulating glass production in a method comprising multiple production steps. First, the spacer is bonded to a first pane and a second pane simultaneously or successively by means of the primary sealant. Only after that can the secondary sealant be introduced, usually by extrusion, into the outer interpane space created.

The object of the present invention is to provide an insulating glazing that enables simplified assembly, as well as a method for its production.

The object of the present invention is accomplished, according to the invention, by an insulating glazing with a spacer, a method for its production, and the use of the spacer according to the independent claim 1. Preferred embodiments of the invention emerge from the dependent claims.

The insulating glazing according to the invention contains at least a first pane, a second pane, and a circumferential spacer surrounding the panes and having a reinforcing profile. The first pane is attached to the first pane contact surface and the first side surface of the spacer, and the second pane is attached to the second contact surface and the second side surface of the spacer. Adjacent the glazing interior surface of the spacer is the glazing interior of the insulating glazing. The outer surface of the polymeric main body, to which the reinforcing profile is attached, delimits the glazing interior from the outer interpane space. The space enclosed by the panes and the glazing interior surface of the spacer is referred to as the "glazing interior". The outer interpane space is the space enclosed by the panes and the main body that is adjacent the outer surface of the main body. The reinforcing profile is thus positioned in the outer interpane space. The reinforcing profile is directly adjacent the surroundings of the glazing at the open edge of the outer interpane space. An outer seal with a secondary sealant according to the prior art is dispensed with completely. In the context of the invention, completely eliminating a secondary sealant means that the continuous layer of a secondary sealant used according to the prior art in the outer interpane space is absent and the outer surface of the reinforcing profile is exposed, i.e., has a surface exposed to the surroundings. Dispensing with an outer seal enables a larger through-vision area of the glazing, since the reinforcing profile can be implemented in a more space-saving manner than the seal used according to the prior art. The spacer comprises at least one polymeric main body and the reinforcing profile. The polymeric main body comprises two pane contact surfaces, a glazing interior surface and an outer surface, wherein the reinforcing profile is attached to the outer surface of the polymeric main body. The reinforcing profile has an inner face that faces the outer surface of the polymeric main body, and an outer face that designates the surface opposite the inner face. The lateral surfaces of the reinforcing profile, via which the inner face and outer face are joined to one another, are referred to as "side surfaces". The inner face of the reinforcing profile is materially bonded to the outer surface of the polymeric main body. The width of the reinforcing profile is equal to at most the width of the polymeric main body, but can also be less than this. The width of the reinforcing profile is defined as the distance between the two side surfaces and the width of the polymeric main body is defined as the distance between the two pane contact surfaces. In the installed state in the glazing, the reinforcing profile absorbs mechanical loads and causes a stiffening of the edge seal. The reinforcing profile thus assumes the role of the secondary sealant used according to the prior art as an outer seal. A secondary sealant can thus be dispensed with. This is accompanied by a substantial simplification of the insulating glass production, since an extrusion system and an extrusion step for introducing the secondary sealant can be dispensed with.

Furthermore, the reinforcing profile is integrated directly into the spacer via the material connection with the main body such that no additional steps are required in the production process for assembling the reinforcing profile. Thus, the spacer is available as a component consisting of the main body and the reinforcing profile already ready for assembly. This results in a saving of time in the production process by which production costs can be reduced. Since the spacer is manufactured independently of the assembly line for insulated glazing and no modifications of the production plant are necessary for the assembly of the spacer, the spacer can be used universally without additional expenditure. Furthermore, the reinforcing profile provides a space-saving and effective stiffening of the edge region of the insulating glazing.

Preferably, the reinforcing profile ends directly flush with the pane edges of the insulating glazing, or is set back by a maximum of 3 mm, preferably a maximum of 1 mm in the direction of the glazing interior. This results in an enlarged through-vision area of the glazing.

The two pane contact surfaces of the polymeric main body comprise a first pane contact surface and a second pane contact surface. The first pane contact surface and the second pane contact surface are the sides of the main body on which the panes (first pane and second pane) of the insulating glazing are mounted during installation of the spacer. The first pane contact surface and the second pane contact surface run parallel to one another.

The glazing interior surface is defined as the surface of the polymeric main body that faces in the direction of the interior of the glazing after installation of the spacer in the insulating glazing. The glazing interior surface is positioned between the panes mounted on the spacer.

The outer surface of the polymeric main body is the side opposite the glazing interior surface, which faces away from the interior of the insulating glazing in the direction of an outer interpane space.

The inner face of the reinforcing profile is the surface that faces the outer surface of the polymeric main body and, in the installed state, faces in the direction of the glazing interior of the insulating glazing. The surface of the reinforcing profile opposite the inner face is referred to as the "outer face" and faces, in the installed state, in the direction of the external surroundings. The side surfaces of the reinforcing profile connect its outer face to the inner face and are, in the installed state of the spacer, the sections of the reinforcing profile facing the panes. The inner face of the reinforcing profile forms its base from which, optionally, legs and/or protrusions of the reinforcing profile protrude in the direction of the glazing interior and/or the outer interpane space.

The reinforcing profile is materially bonded to the polymeric main body in order to ensure simple assembly without additional process steps and without modification of the existing insulating glazing plants. A wide variety of adhesives and/or sealants can be used for bonding the reinforcing profile and the main body. The bonding primarily has the role of fixing the reinforcing profile and the main body such that the components of the spacer can be processed together on an insulating glazing line. The permanent fixation of the reinforcing profile and of the main body occurs via installation in a glazing. The polymeric main body and the reinforcing profile are preferably materially bonded to one another continuously along the spacer via at least one section of the spacer cross-section along the outer surface of the polymeric main body and the inner face of the reinforcing profile. Particularly preferably, the connection of the components is done via a section of the outer surface of the spacer that runs parallel to the glazing interior surface, in particular via a section that is arranged centrally along the cross-section, i.e., is approx. equidistant from both pane contact surfaces. Preferably, the polymeric main body and the reinforcing profile are materially connected to one another continuously along the spacer at least along the section of the outer surface that runs parallel to the glazing interior surface. This ensures a particularly secure connection and prevents displacement of the components during the production process.

In a possible embodiment, the polymeric main body and the reinforcing profile are bonded via a strand of sealant applied continuously or at points, preferably continuously, along the spacer. Suitable sealants are, for example, the sealants used for bonding the panes of the insulating glazing to the pane contact surfaces of the polymeric main body. The same sealant or even a different sealant from the sealant used for bonding the panes can be selected. Such sealants have the advantage that they begin to flow under the action of heat and thus compensate stresses in the installed state of the glazing. Particularly suitable in this context are the sealants often referred to as primary sealants and used in the prior art for bonding the pane contact surfaces of spacers to adjacent panes. Particularly preferably, butyl rubber, polyisobutylene, polyolefin rubber, copolymers, and/or mixtures thereof are used. These enable advantageous flexibility of the bond.

In another embodiment of the invention, the polymeric main body and the reinforcing profile are materially bonded to another via an adhesive. The adhesive can be selected from the adhesives commonly used industrially, taking into account compatibility with the adjacent materials of the polymeric main body, the reinforcing profile, and, if applicable, a barrier film attached to the polymeric main body. For example, adhesives from the groups cyanoacrylate adhesives, methyl methacrylate adhesives, epoxy adhesives, polyurethane adhesives, and silicones, as well as mixtures and copolymers thereof, can be used. The adhesives can be used either as a liquid adhesive and/or in the form of an adhesive tape or a double-sided adhesive tape, with the adhesives mentioned being attached to the opposite outer sides of the adhesive tape. Adhesive tapes can also perform other functions in addition to the bonding of the components, for example, foam adhesive tapes can compensate stresses. Foam adhesive tapes, including polyacrylate adhesives, known under the term "structural glazing tape", are suitable, for example.

In another possible embodiment, the reinforcing profile is coextruded with the polymeric main body. In that case, a barrier film can, optionally, be applied to the outer surface of the polymeric main body. This film is inserted in the extrusion process and is thus directly integrated during coextrusion. Moreover, other layers, such as a layer of a sealant, can also be coextruded during coextrusion of a polymeric main body and a reinforcing profile. Coextrusion of a reinforcing profile and a polymeric main body offers the advantage that after extrusion of the polymeric main body, no further process steps are necessary to apply the reinforcing profile, but, instead, this is already integrated.

The reinforcing profile can assume a wide variety of shapes. Within the width along which is applied, the reinforcing profile is preferably attached over the entire surface of the outer surface. However, alternatively, the reinforcing profile can also have cutouts. Full-surface designs are advantageous in terms of the stiffness of the reinforcing profile, whereas reinforcing profiles with cutouts result in lower thermal conductivity of the resulting insulating glazing. Generally, materials of low thermal conductivity are used for producing the reinforcing profile such that cutouts can preferably be dispensed with. This is also advantageous in terms of simple production.

In a possible embodiment, the reinforcing profile is implemented as a flat profile that can be cut in a simple manner from plate-shaped materials. This is advantageous in terms of the most efficient and economical production.

An advantageous shape of the reinforcing profile is a U-shaped design, in which the reinforcing profile encloses the corners of the polymeric main body and protrudes all the way to sub-regions of the pane contact surfaces. Compared to a flat profile, a U-shaped cross-section provides better stiffening of the profile. The sub-regions of the pane contact surfaces to which the reinforcing profile protrudes are to be provided with a recess that corresponds to the thickness of the reinforcing profile in this region. This ensures that the width of the reinforcing profile does not protrude beyond the width of the polymeric main body. Alternatively, a U-shaped reinforcing profile can be arranged such that the regions of the U-shape running perpendicular to the outer surface of the polymeric main body face away from the pane contact surfaces. In this case, recesses of the polymeric main body can be dispensed with; however, this disadvantageously increases the overall structural height of the spacer. In order to keep the structural height of the spacer as low as possible, the sections of the U-shaped reinforcing profiles facing away from the pane contact surfaces can be designed as short as possible. However, the stability advantages compared to a flat profile also disappear.

In a preferred embodiment, the shape of the reinforcing profile is adapted to the shape of the main body such that the reinforcing profile is implemented in the shape of a counter profile. The counter profile is adapted in its course to the shape of the outer surface of the polymeric main body. Such an embodiment is considered in particular when the outer surface of the main body is, at least in sub-regions, not perpendicular to the pane contact surfaces of the main body. A reinforcing profile as a counter profile is optimally joined to the main body, wherein, in contrast to filling with secondary sealant, no undesirable cavities can develop. The outer face of the reinforcing profile facing away from the outer surface of the polymeric main body can run independently of the inner face of the reinforcing profile. Preferably, the outer face of the reinforcing profile runs substantially parallel to the glazing interior surface of the polymeric main body. Thus, in the installed state, the outer interpane space of the insulating glazing is optimally filled and good stability is achieved.

A reinforcing profile in the form of a counter profile is particularly preferred when the regions of the outer surface of the main body that are adjacent the pane contact surfaces are inclined in the direction of the pane contact surfaces.

In a preferred embodiment of the spacer, the section of the outer surface adjacent the pane contact surfaces of the main body is inclined at an angle of 20° to 70°, preferably of 30° to 60°, relative to the outer surface in the direction of the pane contact surfaces. This angled geometry improves the stability of the polymeric main body. The reinforcing profile of the spacer is implemented as a counter profile, of which the inner face facing the outer surface of the main body has the course accordingly adapted to the geometry of the outer surface. The sections of the inner face adjacent the side surfaces of the reinforcing profile thus run inclined, in sections that correspond in their width to the width of the angled sections of the outer surface. The degree of inclination of the inner face of the reinforcing profile is derived from the inclination of the outer surface of the main body. This enables a flush connection of the inner face of the reinforcing profile to the outer surface of the polymeric main body. Without the use of a counter profile, there would be corner regions set back in angled regions that would have to be filled with a sealant. Undesirable air pockets can develop in the hard-to-reach corner regions. This is avoided by a reinforcing profile adapted to the course of the outer surface. The outer face of the reinforcing profile preferably runs substantially parallel to the glazing interior surface. This creates a planar surface directed toward the surroundings of the glazing, which provides a flat finish. Moreover, the combination of the angled regions of the inner face and the planar outer face produces a stiffening of the reinforcing profile. Protrusions having a substantially triangular cross-section develop in the angled regions of the inner face providing advantageous stabilization. The protrusions having a substantially triangular cross-section are optionally implemented solid, i.e., as solid material, or as a hollow profile section. In the case of a hollow profile section, the cavity is located within the protrusions and is largely or completely enclosed by them. A solid design of the reinforcing profile within the corner protrusions is advantageous in terms of stability, whereas hollow profile shaped corner protrusions offer lower weight with hardly significant stability losses.

In all the embodiments described, the reinforcing profile does not protrude laterally beyond the pane contact surfaces of the polymeric main body. The reinforcing profile is preferably set back in each case by 0.0 mm to 1.5 mm, particularly preferably by 0.3 mm to 1.2 mm, relative to the first pane contact surface and/or the second pane contact surface in the direction of the surface center of the outer surface. This ensures that the layer thickness of the sealant used for bonding the polymeric main body can be adjusted as desired. Primary sealants commonly used for bonding polymeric main bodies in insulating glazings are preferably used in a layer thickness of 0.2 mm to 0.5 mm, measured after pressing of the insulating glazing. A reinforcing profile protruding beyond the pane contact surfaces is a hindrance when using such conventional sealants, since a sufficiently thin layer thickness of the primary sealant is difficult to achieve. The adhesive used for bonding the reinforcing profile can also be used in greater layer thicknesses, with deviations due to manufacturing tolerances being compensated for by the adhesive. Preferably, the width of the reinforcing profile is less than the width of the polymeric main body such that in the event of production-related deviations, it can be ensured that the reinforcing profile does not protrude beyond the width of the polymeric main body under any circumstances.

Preferably, the wall thickness of the reinforcing profile is 0.5 mm to 5.0 mm, preferably 0.5 mm to 2 mm, particularly preferably 0.7 mm to 1.5 mm. The wall thickness is the thickness of the reinforcing profile at the point of least thickness. Thus, regions of greater thickness, such as corner protrusions of the reinforcing profile, are not considered in the determination of the wall thickness. The thickness of the reinforcing profile is determined in the direction parallel to the pane contact surfaces of the main body. In the thickness ranges mentioned, good stiffening of the edge region of an insulating glazing can be achieved. Furthermore, in the preferred ranges of the wall thickness, a larger through-vision area of the glazing can be achieved. In particular, when no further secondary sealants are used and the outer seal is ensured only by the reinforcing profile, a substantial saving of space in the height of the edge region of the insulating glazing is possible.

The height of the reinforcing profile is determined at the point of the reinforcing profile with the greatest thickness. The height is, i.e., at least the amount of the thickness of the reinforcing profile. When using flat profiles, the height is identical to the thickness. In the case of U-shaped reinforcing profiles, the height of the reinforcing profile exceeds the thickness or wall thickness of the reinforcing profile by the amount by which the legs of the U-profile protrude beyond the base of the U-profile. Here, “base of the U-profile” refers to the section of the inner face of the reinforcing profile running parallel to the glazing interior surface. In an embodiment of the spacer in which the corner regions of the main body are angled and the reinforcing profile is implemented as a counter profile, the height of the reinforcing profile is defined by the wall thickness plus the amount by which the protrusions in the corner regions of the reinforcing profile protrude beyond its base. In this case as well, the section of the inner face of the reinforcing profile running parallel to the glazing interior surface is referred to as the “base”. For reinforcing profiles that are not implemented as flat profiles, the height of the reinforcing profile is preferably 0.7 mm to 5.0 mm with a wall thickness of preferably 0.5 mm to 3.0 mm, particularly preferably 1.0 mm to 4.0 mm with a wall thickness of 0.7 mm to 2.0 mm, in particular 1.0 mm to 3.0 mm with a wall thickness of 0.7 mm to 1.2 mm.

The polymeric main body preferably contains polyethylene (PE), polycarbonates (PC), polypropylene (PP), polystyrene, polybutadiene, polynitriles, polyesters, polyurethanes, polymethyl methacrylates, polyacrylates, polyamides, polyethylene terephthalate (PET), polybutylene terephthalate (PBT), preferably polyethylene terephthalate (PET), acrylonitrile butadiene styrene (ABS), acrylonitrile styrene acrylester (ASA), acrylonitrile butadiene styrene/polycarbonate (ABS/PC), styrene acrylonitrile (SAN), PET/PC, PBT/PC, SAN/PC, and/or copolymers or mixtures thereof. In particular, styrene acrylonitrile (SAN), acrylonitrile butadiene styrene (ABS), acrylonitrile styrene acrylester (ASA), and copolymers and/or mixtures thereof are preferred components, since they have good mechanical properties and high breaking strength. The use according to the invention of a reinforcing profile enables, in principle, a large range of main body materials. Due to the fact that mechanical loads that act on the edge region of the glazing are primarily absorbed by the reinforcing profile, the material of the main body can be freely selected within wide limits. Thus, even economical main body materials can be used that are, due to poorer mechanical properties, only suitable for use in insulating glazings to a limited extent.

The reinforcing profile according to the invention can be made of plastics and/or metals. Plastics are preferred due to their lower thermal conductivity compared to metals.

In principle, the plastics mentioned for the main body can also be used for the reinforcing profile. These have low thermal conductivity. Preferably, the reinforcing profile comprises polyethylene terephthalate (PET), styrene acrylonitrile (SAN), acrylonitrile butadiene styrene (ABS), acrylonitrile styrene acrylester (ASA), acrylonitrile butadiene styrene/polycarbonate (ABS/PC), styrene acrylonitrile/polycarbonate (SAN/PC), and/or copolymers or mixtures thereof.

The reinforcing profile and the polymeric main body can be made from the same polymeric base material or can even be based on different polymers. Manufacturing the polymeric main body and the reinforcing profile from the same plastic base material has the advantage that recycling of the spacer after the end of the service life of the glazing is simplified. The components of the main body other than the polymeric base material can differ even with the selection of the same base material. For example, the mechanical properties of the reinforcing profile and of the main body can be selectively adjusted by the addition of further components, such as glass fibers.

Some advantageous material combinations of a polymeric main body and a reinforcing profile are mentioned in the following by way of example:

1. Polymeric main body and reinforcing profile each comprising SAN, wherein the main body and the reinforcing profile have the same polymeric base material.

Such a combination is advantageous due to improved recyclability and good customer acceptance of SAN as main body material.

2. Polymeric main body made of any economical polymeric material and reinforcing profile made of SAN, SAN/PC, ABS, and/or ABS/PC Reinforcing profiles made of SAN have good stiffness, which can be further increased by the addition of polycarbonate. ABS is characterized by improved stiffness compared to SAN, which can likewise be increased by the addition of polycarbonate. Reinforcing profiles made of materials with high stiffness enable an almost free selection of the material of the main body.

3. Polymeric main body and reinforcing profile each comprising PET

PET has very good strength, is economical and readily recyclable.

In another embodiment, the reinforcing profile can comprise metals, preferably aluminum and/or stainless steel. Aluminum and stainless steel are characterized by suitable mechanical properties, but have higher thermal conductivity than plastics. Metallic reinforcing profiles can be combined with all of the main body materials mentioned. To reduce the thermal conductivity of a metallic reinforcing profile, cutouts can be provided in the reinforcing profile. By way of example, elongated cutouts that extend from one side surface to the opposite side surface of the reinforcing profile can be mentioned. Alternatively, the reinforcing profile can also be implemented in multiple pieces, wherein, along the spacer, a strip of a material with low thermal conductivity is embedded, which inhibits thermal conduction from one side surface of the reinforcing profile to the opposite side surface. Said insulating material strip runs, for example, substantially parallel to the side surfaces of the reinforcing profile. Such multi-part embodiments of metallic reinforcing profiles and also metallic reinforcing profiles with cutouts require higher production outlays compared to polymeric reinforcing profiles, which are, for this reason, preferably used.

Preferably, the main body and/or the reinforcing profile contain one or more reinforcement means. With regard to the reinforcing profile, this applies to reinforcing profiles comprising plastics.

A wide variety of reinforcement means in the form of fiber, powder, or platelets are known to the person skilled in the art as reinforcement means. The powder- and/or platelet-formed reinforcement means include, for example, mica and talc. Particularly preferred, in terms of mechanical properties are reinforcing fibers, including glass fibers, aramide fibers, ceramic fibers, or natural fibers. Alternatives to these are also ground glass fibers or hollow glass spheres. These hollow glass spheres have a diameter of 10 μm to 20 μm and improve the stability of the hollow profile. Suitable hollow glass spheres are commercially available under the name "3M™ Glass Bubbles". In one possible embodiment, the polymeric main body contains both glass fibers and, preferably, also hollow glass spheres. An admixture of hollow glass spheres results in a further improvement of the thermal properties of the hollow profile.

Preferably, one or more of the reinforcement means mentioned, particularly preferably glass fibers, are likewise added to a reinforcing profile according to the invention comprising a plastic base material.

Particularly preferably, glass fibers are used as reinforcement means in the polymeric main body, being added at a proportion of 25 wt.-% to 40 wt.-%, in particular at a proportion of 30 wt.-% to 35 wt.-%. Within these ranges, good mechanical stability and strength of the main body can be observed. Furthermore, a glass fiber content of 30 wt.-% to 35 wt.-% is quite compatible with the multilayer barrier film composed of alternating polymeric layers and metallic or ceramic layers applied to the outer surface of the main body in a preferred embodiment. By adapting the coefficient of thermal expansion of the polymeric main body and the barrier film or barrier coating, temperature-induced stresses between the different materials and flaking of the barrier film will barrier coating can be avoided.

The glass fiber content of the reinforcing profile is preferably 30 wt.-% to 60 wt.-%, particularly preferably 37 wt.-% to 50 wt.-%. The higher glass fiber content of the reinforcing profile compared to the polymeric main body results in advantageously improved stiffness of the reinforcing profile.

The main body preferably comprises a gas- and vapor-tight barrier that serves to improve the gas-tightness of the main body. Preferably, this is applied to at least the outer surface of the polymeric main body, preferably to the outer surface and to a portion of the pane contact surfaces. The gas- and vapor-tight barrier improves the tightness of the spacer against gas loss and moisture penetration. Preferably, the barrier is applied to about one half to two thirds of the pane contact surfaces. Particularly preferably, barrier films are used, with a suitable barrier film being disclosed, for example, in WO 2013/104507 A1.

In a preferred embodiment, the gas- and vapor-tight barrier on the outer surface of a polymeric main body is implemented as a film. This barrier film contains at least one polymeric layer and one metallic layer or one ceramic layer. The layer thickness of the polymeric layer is between 5 μm and 80 μm, while metallic layers and/or ceramic layers with a thickness of 10 nm to 200 nm are used. Within the layer thicknesses mentioned, particularly good tightness of the barrier film is achieved. The barrier film can be applied to the polymeric main body, for example, glued. Alternatively, the film can be coextruded together with the main body.

Particularly preferably, the barrier film contains at least two metallic layers and/or ceramic layers, arranged alternatingly with at least one polymeric layer. The layer thicknesses of the individual layers are preferably as described in the preceding paragraph. Preferably, the outer layers are formed by a metallic layer. The alternating layers of the barrier film can be bonded or applied to one another in a wide variety of methods known from the prior art. Methods for depositing metallic or ceramic layers are sufficiently known to the person skilled in the art. The use of a barrier film with an alternating layer sequence is particularly advantageous in terms of the tightness of the system. A defect in one of the layers does not lead to a loss of function of the barrier film. In comparison, even a small defect in a single layer can lead to a complete failure. Furthermore, the application of multiple thin layers is advantageous compared to one thick layer, since the risk of internal adhesion problems increases with increasing layer thickness. Also, thicker layers have higher conductivity such that such a film is less suitable thermodynamically.

The polymeric layer of the film preferably comprises polyethylene terephthalate, ethylene vinyl alcohol, polyvinylidene chloride, polyamides, polyethylene, polypropylene, silicones, acrylonitriles, polyacrylates, polymethyl acrylates, and/or copolymers or mixtures thereof. The metallic layer preferably contains iron, aluminum, silver, copper, gold, chromium, and/or alloys or oxides thereof. The ceramic layer of the film preferably contains silicon oxides and/or silicon nitrides.

In an alternative preferred embodiment, the gas- and vapor-tight barrier is preferably implemented as a coating. The coating contains aluminum, aluminum oxides, and/or silicon oxides and is preferably applied by a PVD method (physical vapor deposition). The coating with the materials mentioned provides particularly good results in terms of tightness and additionally exhibits excellent adhesion properties to the materials of the outer seal used in insulating glazings.

In a particularly preferred embodiment, the gas- and vapor-tight barrier has at least one metallic layer or ceramic layer, which is implemented as a coating and contains aluminum, aluminum oxides, and/or silicon oxides, and is preferably applied by a PVD method (physical vapor deposition).

In the insulating glazings known in the prior art, a layer of a sealant, also referred to as a primary sealant, or an outer seal, also referred to as a secondary sealant, is adjacent the gas- and vapor-tight barrier. The manufacturer of the insulating glazing is supplied with a spacer including assembly instructions listing the sealants that can be used in combination with the barrier film. The use of different sealants may result in compatibility problems of the film and sealant or outer seal. In the spacer of the insulating glazing according to the invention including a reinforcing profile, the barrier film is at least largely covered by the reinforcing profile such that the compatibility problem described can at least be reduced. Moreover, the reinforcing profile replaces the secondary sealant, as a result of which the insulating glazing manufacturer does not have to make any critical sealant selection in this regard. The problem of mechanical damage to the barrier film during transport or assembly is also eliminated when the insulating glazing according to the invention is used.

The polymeric main body can be formed as a hollow profile, as a body including a silicon foam, and/or as a solidly molded thermoplastic body. Spacers made of silicone foams and so-called TPS spacers are known to the person skilled in the art.

Preferably, the polymeric main body is designed as a hollow profile, whereby, on the one hand, a weight reduction is possible compared to a solidly molded main body, and, on the other, a cavity is available in the interior of the main body for accommodating other components, such as a desiccant.

Preferably, the glazing interior surface of the polymeric main body has at least one opening. Preferably, multiple openings are provided in the glazing interior surface. The total number of openings depends on the size of the insulating glazing. The openings connect the cavity to the inner interpane space, as a result of which a gas exchange between them becomes possible. This allows absorption of humidity by a desiccant situated in the cavity and thus prevents fogging of the panes. The openings are preferably implemented as slots, particularly preferably as slots with a width of 0.2 mm and a length of 2 mm. The slots ensure optimum air exchange without desiccant being able to penetrate out of the cavity into the inner interpane space.

The polymeric main body preferably contains a desiccant, preferably silica gels, molecular sieves, $CaCl_2$, $Na_2SO_4$, activated carbon, silicates, bentonites, zeolites, and/or mixtures thereof. The desiccant is preferably incorporated into the main body. Particularly preferably, the desiccant is situated in the cavity of the main body.

The spacer of the insulating glazing according to the invention optionally includes a pressure equalization body that is preferably embedded flush in the outer face of the reinforcing profile. In the prior art, a wide variety of pressure equalization systems for insulating glazings are known, which are intended to enable pressure equalization between an inner interpane space of the insulating glazing and the surroundings. Particularly advantageous are pressure equalization bodies which, although they enable pressure equalization, do not allow any passage of water in drop form and inhibit water-vapor diffusion as much as possible. The use of a reinforcing profile in the spacer offers the capability of integrating such pressure equalization bodies and also, if necessary, other cylindrical components in a simple manner. A pressure equalization body to be integrated in the spacer in a simple manner is disclosed, for example, in WO 2019/110409. The insulating glazing described there includes a pressure equalization body that is inserted into an opening on the outer surface of the spacer. By means of a combination of capillary and gas-permeable membrane, the pressure equalization body brings about an exchange of air and the associated pressure equalization between the inner interpane space and the ambient air. Pressure equalization takes place via a diffusion process through the capillary and the membrane. According to the prior art, the pressure equalization bodies described are inserted in an insulating glazing whose outer interpane space is filled with secondary sealant. For this purpose, an opening is first created on the outer surface of the polymeric main body, in the region of which the secondary sealant is also removed. The pressure equalization body is inserted into this bore at the outer surface of the main body and remaining gaps are sealed with a sealant. This method is difficult to automate; however, in this way, no changes are necessary when filling the edge region with secondary sealant. Alternatively, the prior art pressure equalization body can also be inserted before introducing the secondary sealant; however, in this case, the system for introducing the secondary sealant must be modified such that it recognizes the pressure equalization body as an obstacle and bypasses it. From these statements concerning the prior art, it is clear that the integration of a pressure equalization body requires additional effort in the manufacture of insulating glass. In a preferred embodiment of the insulating glazing according to the invention, the spacer having a reinforcing profile already includes a pressure equalization body. Thus, additional effort on the part of the insulating glass manufacturer can be mostly avoided; the manufacturer merely has to insert the desired spacer module including a pressure equalization body into the spacer frame. According to the invention, the outer interpane space is sealed by the reinforcing profile such that the described problem of the filling with a secondary sealant does not arise.

Optionally, before assembly, the spacer can already be provided with sealants and/or adhesives that are situated as pre-applied strips on the pane contact surfaces of the main body and/or the side surfaces of the reinforcing profile. These adhesive strips and sealant strips are preferably provided with a protective film to prevent unwanted bonding with adjacent spacers and/or other components during transport and storage of the spacers. To apply the spacer on a pane, the insulating glass manufacturer only has to remove the protective film and press the spacer onto the pane surface. The spacer can optionally include the same adhesive with the same sealant or different adhesives and/or sealants in the region of the pane contact surfaces and the side surface.

Preferably, a primary sealant is pre-applied in the region of the first and/or the second pane contact surface as a sealant strip in the form of an extruded strand of sealant. The primary sealant preferably comprises butyl rubber, polyisobutylene, polyethylene vinyl alcohol, ethylene vinyl acetate, polyolefin rubber, copolymers, and/or mixtures thereof. The strand of sealant is preferably covered by a protective film that is removed before assembly of the spacer.

Preferably, a pre-applied adhesive strip is also attached in the region of the side surfaces of the reinforcing profile. The adhesives used for bonding the reinforcing profile have greater stiffness than the sealants used for bonding the main body. This is advantageous in terms of the stiffening of the edge region. Adhesives particularly suitable for bonding the reinforcing profile are acrylate adhesives, polyurethane adhesives, silicones, silane-modified polymer adhesives, as well as mixtures and copolymers thereof. If the spacer is provided with a pre-applied adhesive strip in the region of the side surfaces of the reinforcing profile, adhesive tapes including acrylate adhesives are preferably used for this purpose. Suitable adhesive tapes including acrylate adhesives are commercially available, for example, under the term “structural glazing tape”. Even at low thicknesses in the range from 0.3 mm to 0.5 mm, these provide a good seal against water and moisture. Moreover, no time for curing of the adhesives has to be taken into account in the production process.

The spacer can optionally include another adhesive strip extending circumferentially on the outer face of the reinforcing profile. This is likewise covered by a protective film. At the time of assembly of the insulating glazing in a window frame, the protective film is removed and the insulating glazing can be bonded in the frame in addition to the customary attachment in the frame element. Preferably, for this purpose, a foam adhesive tape based on a foam tape provided with acrylate adhesive is used.

Optionally, all surfaces of the spacer that are intended for bonding with a sealant and/or adhesive can be prepared with a plasma and/or corona treatment. This improves the adhesion of the surfaces. This has proved useful in particular for polymeric main bodies and/or reinforcing profiles comprising SAN and/or PET.

The polymeric main body of the spacer has, along the pane contact surfaces, a height of 5 mm to 15 mm, particularly preferably of 5 mm to 10 mm.

The width of the glazing interior surface is 4 mm to 30 mm, preferably 8 mm to 16 mm.

In a preferred embodiment, the polymeric main body and the reinforcing profile are fixed to the first pane and/or second pane via the same adhesive. This is advantageous in terms of simplified manufacture of the insulating glazing. A suitable adhesive is, for example, a reactive two-component hotmelt adhesive to which additives for chemical crosslinking are preferably added.

In another preferred embodiment, the polymeric main body is bonded via a sealant; and the reinforcing profile, via an adhesive in each case to the first pane and/or second pane. This is advantageous in order, on the one hand, to be able to select an elastic sealant for the polymeric main body, which ensures good sealing even when climate loads occur; and, on the other, to use an adhesive with high stiffness for bonding the reinforcing profile.

In this case, the two panes are attached to the pane contact surfaces, preferably via a primary sealant, which is applied between the first pane contact surface and the first pane and/or the second pane contact surface and the second pane.

The primary sealant preferably contains butyl rubber, polyisobutylene, polyethylene vinyl alcohol, ethylene vinyl acetate, polyolefin rubber, polypropylene, polyethylene, copolymers, and/or mixtures thereof. The sealant is gas- and water-tight such that the glazing is sealed against the ingress of atmospheric humidity as well as the escape of a filler gas (if present).

The primary sealant is preferably introduced into the gap between spacer and the panes with a thickness of 0.1 mm to 0.8 mm, particularly preferably of 0.2 mm to 0.4 mm.

The reinforcing profile is preferably attached to both panes via an adhesive that is applied between the first side surface and the first pane and/or the second side surface and the second pane.

The adhesive for bonding the reinforcing profile is preferably an acrylate adhesive, polyurethane adhesive, silicone adhesive, silane-modified polymer adhesive, a mixture, and/or copolymer thereof.

An acrylate adhesive for bonding the reinforcing profile is used, in particular, in the form of an adhesive tape, which can, optionally, already be pre-applied to the spacer. Such acrylate adhesive types suitable for glazing applications are commercially available, provide a good seal against moisture, and require no curing time.

Alternatively, the adhesive for bonding the reinforcing profile can also be applied in liquid form. In this case, two-component silicones, reactive polyurethane hotmelt adhesives, and/or silane-modified polymer adhesives in particular have proved to be advantageous. Two-component silicones have good mechanical strength and elasticity as well as rapid curing. Due to the good elastic properties, surface unevenness can be smoothed out well. Reactive polyurethane hotmelt adhesives have fast initial strength and high final strength, with permanent full curing achievable within approx. 24 hours. Silane-modified polymer adhesives are particularly hard.

The adhesive for bonding the reinforcing profile is preferably introduced into the gap between the reinforcing profile and the panes with a thickness of 0.2 mm to 1.6 mm, particularly preferably 0.3 mm to 1.4 mm, with said thicknesses existing after the pressing of the insulating glazing. The liquid adhesives mentioned as preferred can be used flexibly within these layer thicknesses. The adhesive layer thickness used can be flexibly adapted to the required layer thickness of the sealant and to any offset of the side surfaces of the reinforcing profile in the direction of the surface center of the outer surface.

The glazing interior of the insulating glazing is preferably filled with a protective gas, preferably with a noble gas, preferably argon or krypton, which reduce the heat transfer value in the insulating glazing interpane space.

In a possible embodiment, the insulating glazing comprises more than two panes.

In this case, for example, a third pane can be fixed in or on the spacer between the first pane and the second pane. In this embodiment, only a single spacer is used, which carries a reinforcing profile on its outer face.

Alternatively, multiple spacers can also be used. A further spacer is fixed to the first pane and/or second pane parallel to the spacer situated between the first and second pane. According to this embodiment, the insulating glazing has multiple spacers having a reinforcing profile.

The first pane and the second pane of the insulating glazing contain glass and/or polymers, preferably quartz glass, borosilicate glass, soda lime glass, polymethyl methacrylate, and/or mixtures thereof. Possible additional panes likewise comprise these materials, wherein the composition of the panes can also be different.

The panes of the insulating glazing according to the invention have a thickness of 1 mm to 50 mm, preferably 3 mm to 16 mm, particularly preferably 3 mm to 10 mm, wherein the two panes can also have different thicknesses.

At the corners of the insulating glazing, two mitered spacers abut and are, for example, welded to one another. To ensure good sealing of these welds, use of a primary sealant for bonding the main body to the reinforcing profile is advantageous. This sealant begins to flow during the welding operation and fills any gaps. As a result, good sealing of the welds is achieved. Alternatively, or additionally, any voids in the reinforcing profile can be filled with sealant to further improve the sealing of the welds.

In another embodiment, the corners of the spacer frame can be provided with corner connectors. Corner connectors can, for example, be implemented as a plastic molded part with or without a seal, in which two spacers abut. The legs of the corner connectors are inserted into the cavities of the spacer. The corner conductors optionally contain a seal that is compressed and thus sealed upon assembly of the individual parts, or are sealed by additional application of a sealant.

In principle, a wide variety of geometries of the insulating glazing are possible, for example, rectangular, trapezoidal, and rounded shapes. To produce rounded geometries, the spacer can, for example, be bent in the heated state. To facilitate bending of the spacer, the reinforcing profile can be cut at the outer bending radius and have, for example, V-shaped milling.

The invention further includes a method for producing an insulating glazing according to the invention, wherein a spacer according to the invention having a reinforcing profile is provided, a first pane is attached to the first pane contact surface of the polymeric main body and the first side surface of the reinforcing profile; and a second pane is attached to the second pane contact surface of the polymeric main body and the second side surface of the reinforcing profile, and the pane assembly is pressed to form an insulating glazing.

The first pane and the second pane can be attached to the spacer successively or simultaneously. The panes are preferably bonded to the pane contact surfaces via a primary sealant. At the side surfaces of the reinforcing profile, bonding is preferably carried out via one of the adhesives described for this purpose. The sealant and the adhesive can already be pre-applied to the spacer and are thus provided together with it. In this case, prior to attaching the panes, it is necessary only to remove a protective film protecting the sealant and adhesive strips. Alternatively, the sealant is applied to the pane contact surfaces prior to attaching the panes, preferably as a strand, for example, with a diameter of 1 mm to 2 mm. Before, after, or at the same time, but in any case prior to attaching the panes, the adhesive is applied on the side surfaces of the reinforcing profile. During the pressing of the pane assembly, the sealant and the adhesive are distributed evenly in the gap between the pane contact surface and the adjacent pane and between side surface and the adjacent pane, resulting in sealing of the gap. Alternatively, the panes can be fixed, as described, via adhesive tapes, or the main body and the reinforcing profile can be bonded with the same adhesive.

Preferably, the glazing interior between the panes is filled with a protective gas prior to the pressing of the assembly.

The invention further includes the use of an insulating glazing according to the invention as building glazing or façade glazing.

Figure 1B:
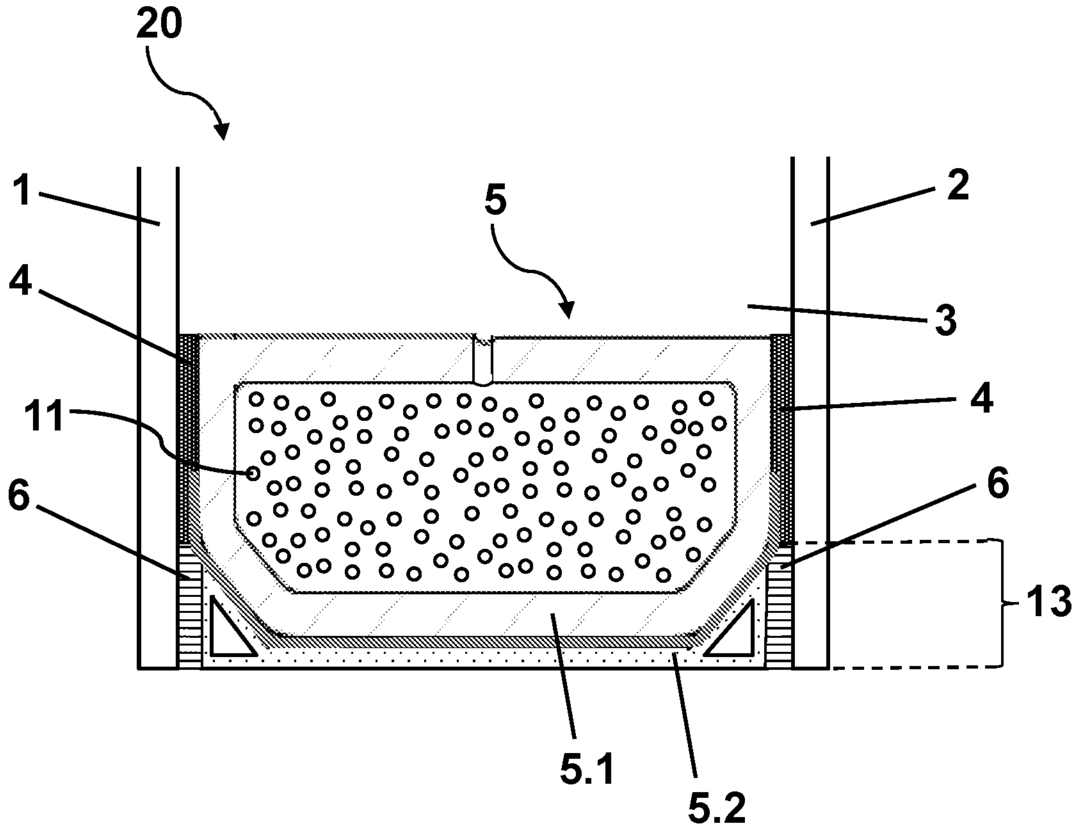

The invention is explained in detail in the following with reference to drawings. The drawings are purely schematic representations and are not to scale. They in no way restrict the invention. They depict:

FIG. 1*a* a schematic representation of the spacer of the insulating glazing according to the invention having a reinforcing profile as a counter profile of a main body with an angled outer surface, FIG. 1*b* a schematic representation of the insulating glazing according to the invention with a spacer according to FIG. 1*a,*

Figure 2:
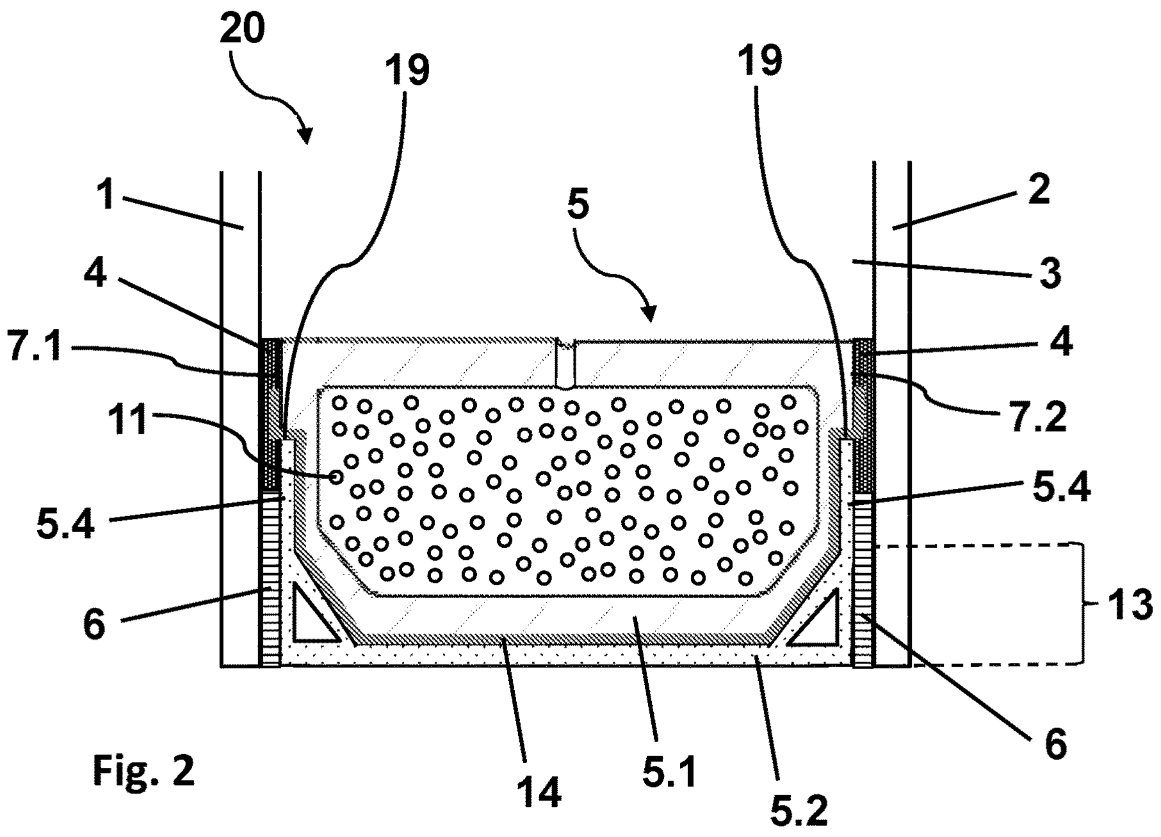
Figure 3:
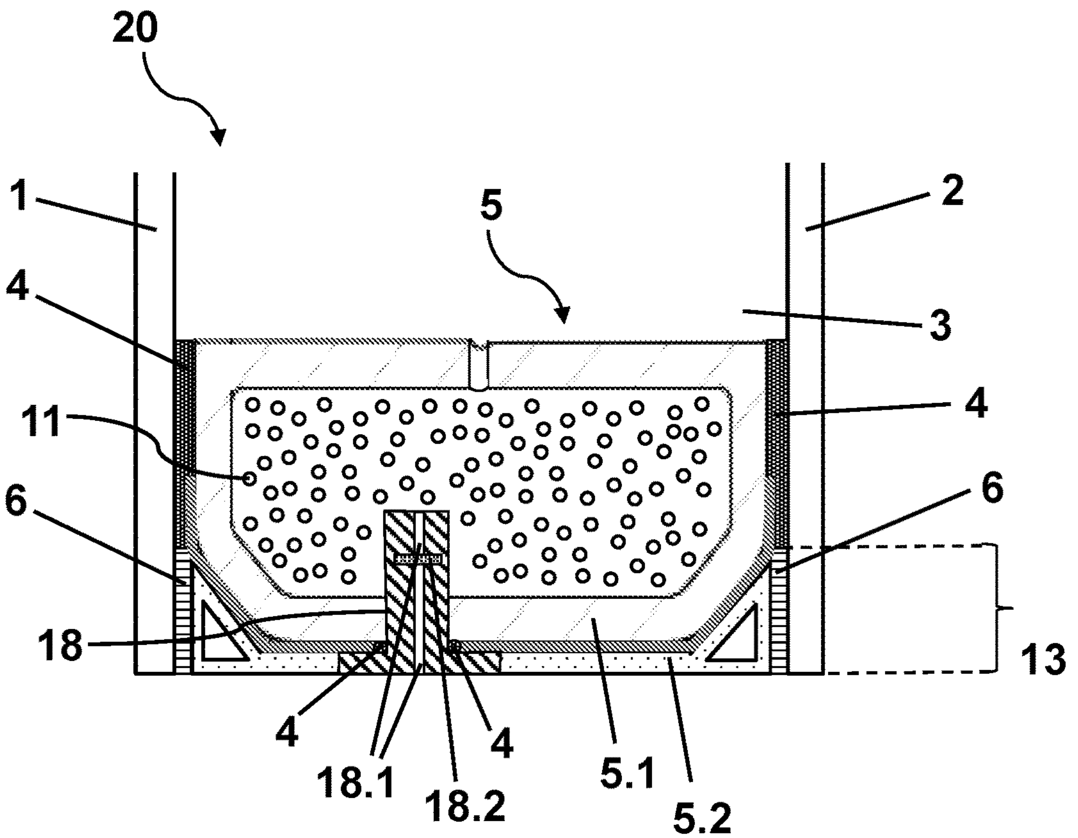
Figure 4:
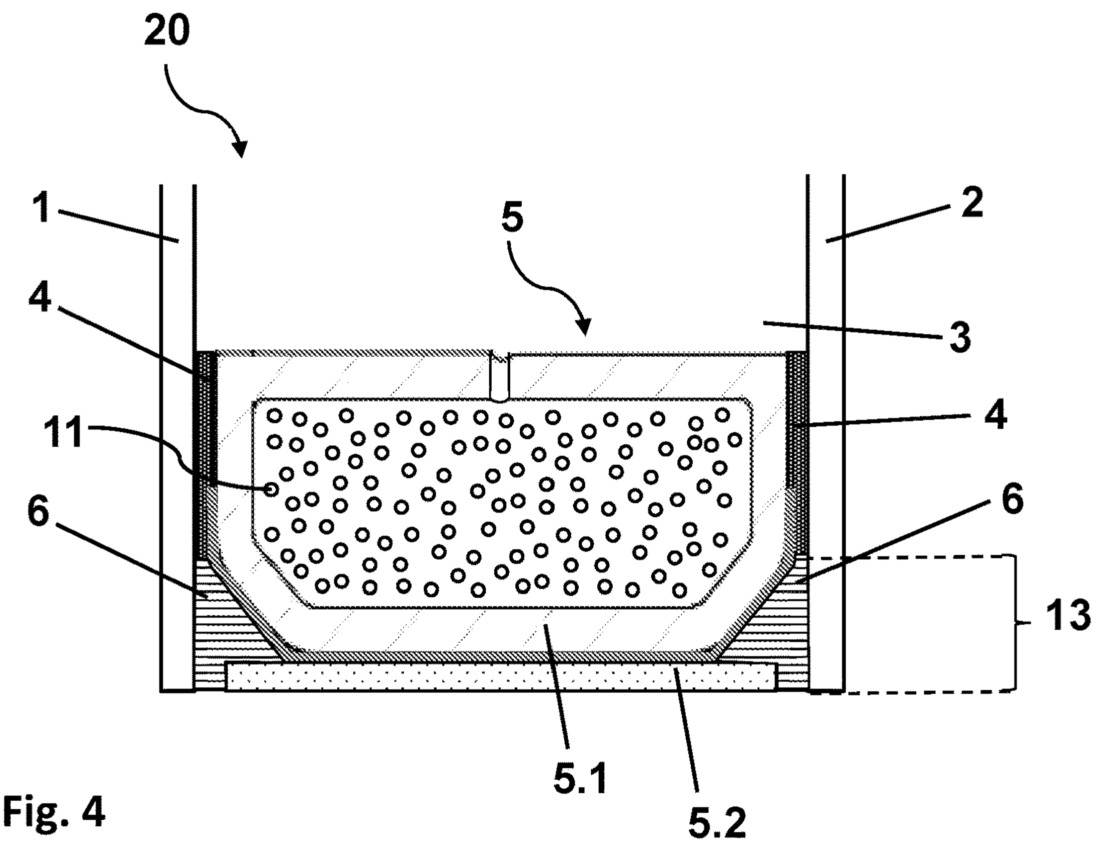
Figure 5:
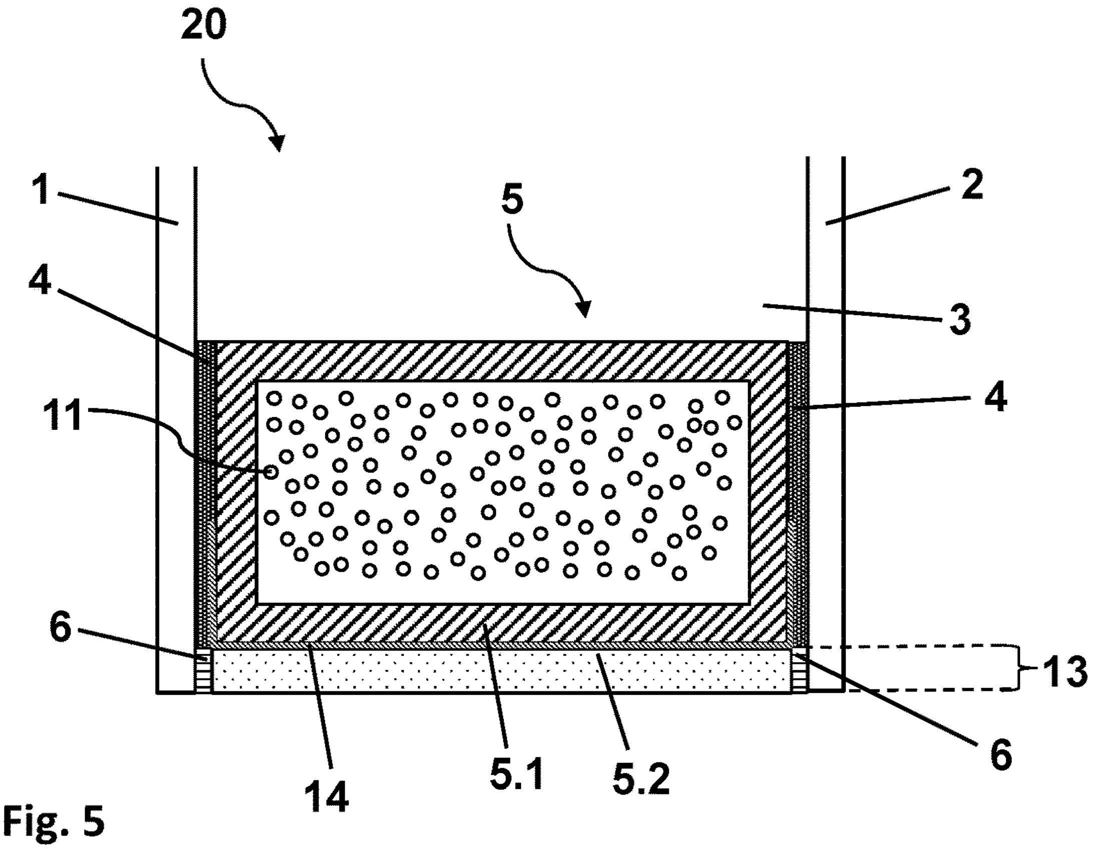
Figure 6:
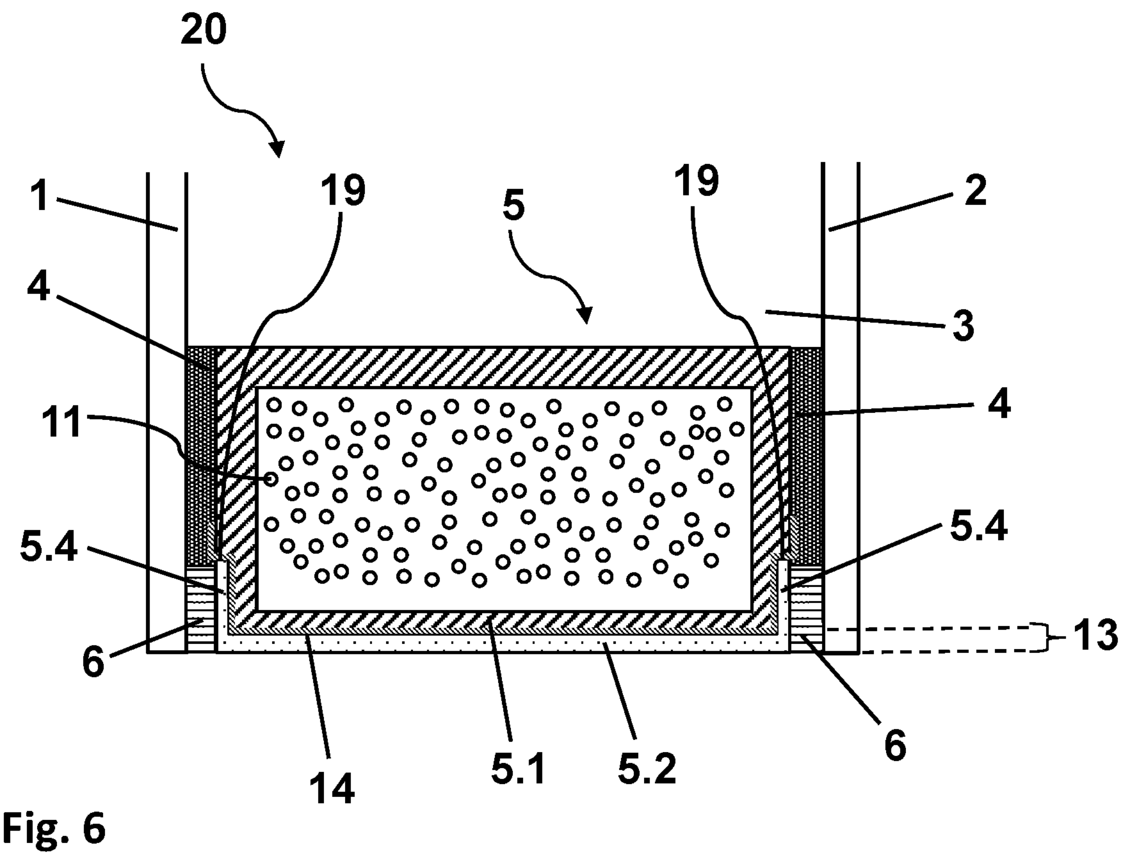
Figure 7:
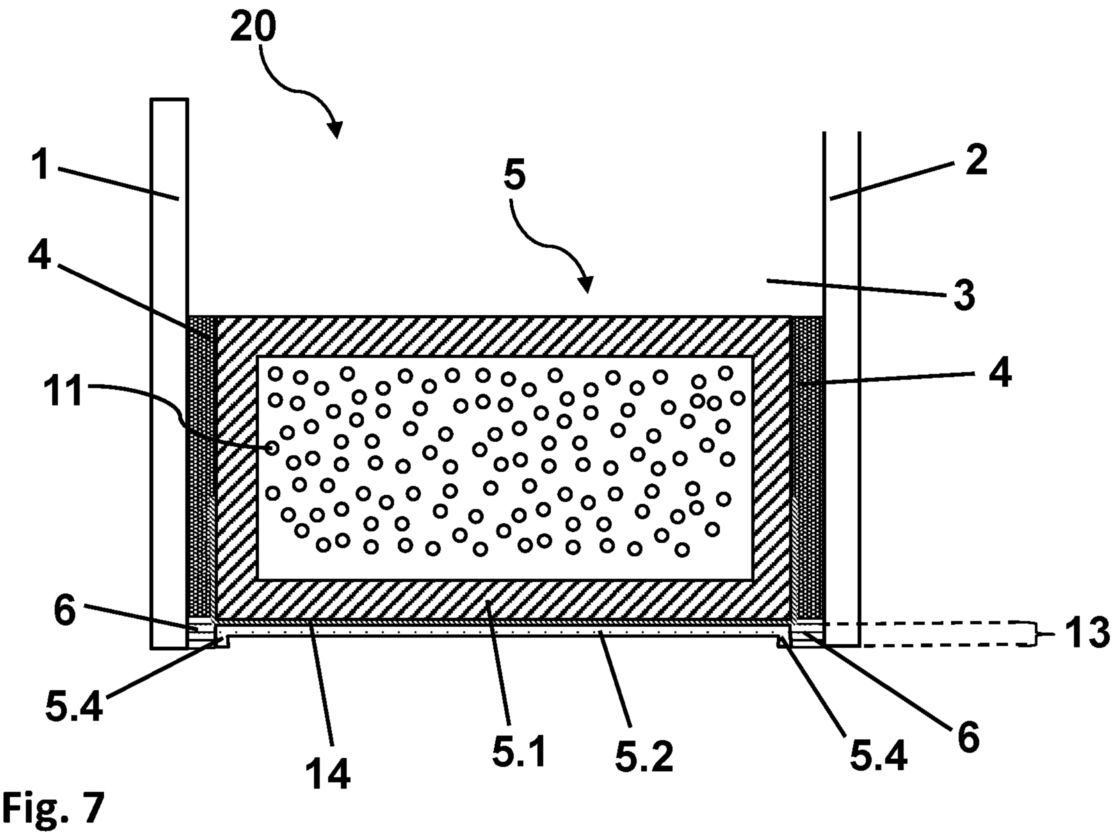

FIG. 2 another embodiment of an insulating glazing according to the invention with a reinforcing profile as a counter profile that has legs that are extended all the way to the pane contact surfaces of the main body, FIG. 3 the insulating glazing of FIG. 1*b*, wherein, on the outer face of the reinforcing profile, a pressure equalization body is inserted on the outer surface, FIG. 4 another embodiment of an insulating glazing according to the invention with a flat profile as a reinforcing profile and a main body with an angled outer surface, FIG. 5 an embodiment of an insulating glazing according to the invention with a flat profile as a reinforcing profile and a main body with a planar outer surface, FIG. 6 an embodiment of an insulating glazing according to the invention with a U-shaped reinforcing profile and a main body with a planar outer surface, wherein the legs of the reinforcing profile enclose sub-regions of the pane contact surfaces, and FIG. 7 an embodiment of an insulating glazing according to the invention with a U-shaped reinforcing profile and a main body with a planar outer surface, wherein the legs of the reinforcing profile point in the direction of the outer interpane space.

FIG. 1*a* depicts a schematic representation of the spacer 5 of the insulating glazing according to the invention comprising a polymeric main body 5.1 and a reinforcing profile 5.2 as a counter profile. The polymeric main body 5.1 is a hollow body profile comprising two pane contact surfaces 7.1 and 7.2, a glazing interior surface 8, an outer surface 9, and a cavity 10. The polymeric main body 5.1 contains styrene acrylonitrile (SAN) and approx. 35 wt.-% glass fiber. The outer surface 9 has an angled shape, with the sections of the outer surface adjacent the pane contact surfaces 7.1 and 7.2 inclined at an angle of 30° relative to the pane contact surfaces 7.1 and 7.2. This improves the stability of the glass-fiber-reinforced polymeric main body 5.1. The glazing interior surface 8 of the spacer 5 has openings 12, which are provided at regular intervals circumferentially along the glazing interior surface 8 to enable a gas exchange between the interior of the insulating glazing and the cavity 10. Thus, any humidity present in the interior can be absorbed by a desiccant that can be introduced into the cavity 10. The openings 12 are implemented as slots with a width of 0.2 mm and a length of 2 mm. A barrier film 14 that encloses the outer surface 9 and projects up to sub-regions of the pane contact surfaces 7.1 and 7.2 is attached to the outer surface 9 of the polymeric main body 5.1. The reinforcing profile 5.2 is applied to the outer surface 9 of the polymeric main body 5.1 that carries the barrier film 14. In this way, the barrier film 14 is protected against damage during transport and installation. The polymeric main body 5.1, the barrier film 14, and the reinforcing profile 5.2 are coextruded, but can, alternatively, also be bonded. The reinforcing profile 5.2 has an inner face 15, which is materially bonded to the barrier film 14, and an outer face 16, which is positioned opposite the inner face 15. The side surfaces 17.1 and 17.2 of the reinforcing profile 5.2 running parallel to the pane contact surfaces 7.1 and 7.2 are set back laterally relative to the pane contact surfaces 7.1 and 7.2 in the direction of the surface centers of the outer face 16 and the outer surface 9. Mechanical loads acting on the insulating glazing are effectively absorbed by the reinforcing profile 5.2. The reinforcing profile 5.2 is set back at the side surfaces 17.1 and 17.2 in each case by 0.5 mm relative to the nearest pane contact surface 7.1 and 7.2 in the direction of the surface center of the outer surface 9. The reinforcing profile 5.2 is made of styrene acrylonitrile (SAN) and approx. 40 wt.-% glass fiber and has a wall thickness, i.e., a thickness, of 1.0 mm. The height of the reinforcing profile 5.2 is 4.0 mm. The reinforcing profile 5.2 is implemented as a counter profile to the polymeric main body 5.1 such that in regions where the outer surface 9 of the main body 5.1 is angled, these regions are filled by the reinforcing profile 5.2. Thus, no undesirable cavities remain at the transition between the main body 5.1 and the reinforcing profile 5.2. The angled design of the sections of the outer surface 9 of the polymeric main body 5.1 that are adjacent the pane contact surfaces 7.1 and 7.2 results in sections of the reinforcing profile 5.2 congruent therewith. In these sections, the inner face 15 of the reinforcing profile 5.2 is inclined toward the main body 5.1 by the corresponding amount of 30°. The corresponding regions of the reinforcing profile 5.2 are thus implemented with a protrusion 5.3 with a triangular contour and can be designed either as solid material, or, as depicted in FIG. 1*a*, with a cavity. The cavity in this region of the reinforcing profile 5.2 results in weight saving.

FIG. 1*b* depicts an insulating glazing according to the invention with a spacer 5 according to FIG. 1*a*. The spacer 5 according to the invention comprising the polymeric main body 5.1 and the reinforcing profile 5.2 is attached circumferentially between a first pane 1 and a second pane 2 via a sealant 4. The glazing interior 3 adjacent the glazing interior surface 8 of the spacer 5 is defined as the space delimited by the panes 1, 2 and the spacer 5. The outer interpane space 13 adjacent the outer surface 9 of the spacer 5 is a strip-shaped circumferential section of the glazing, which is delimited on one side each by the two panes 1 and 2 and on another side by the spacer 5 and whose fourth edge is open. The glazing interior 3 is filled with argon. The cavity 10 is filled with a desiccant 11. Molecular sieve is used as the desiccant 11. The sealant 4 bonds the pane contact surfaces 7.1 and 7.2 of the spacer 5 to the panes 1 and 2, respectively. The sealant 4 is a primary sealant that serves to seal the glazing interior 3 against the passage of gases and water. Polyisobutylene is introduced in each case as sealant 4 between a pane contact surface 7.1 and 7.2 and the adjacent pane 1 and 2, sealing the gap between pane 1 or 2 and spacer 5. The side surfaces 17.1 and 17.2 of the reinforcing profile 5.2 are bonded to the adjacent panes 1 and 2 of the insulating glazing 20 via an adhesive 6. The adhesive 6 used is, for example, an adhesive tape with polyacrylate adhesive or a two-component silicone adhesive used as a liquid adhesive. These adhesives promote good absorption of mechanical loads by the reinforcing profile 5.2. When a spacer 5 having a reinforcing profile 5.2 is used, a further outer seal in the outer interpane space 13 can be dispensed with completely. Such an outer seal used according to the prior art is usually introduced into the outer interpane space in a thickness of approx. 3 mm to 5 mm. The reinforcing profile 5.2 has a wall thickness of only 1.0 mm such that the edge region of the glazing can be designed narrower, compared to arrangements known in the prior art with external sealing. As a result, the through-vision area of the insulating glazing 20 is enlarged. Moreover, the reinforcing profile 5.2 contributes to a reduced heat transfer coefficient of the edge seal due to its lower height. In addition, the materials preferred for the reinforcing profile 5.2 according to the invention have lower thermal conduction than the external seals usually used. Thus, the thermal conductivity of the insulating glazing 20 can be improved compared to the prior art. The reinforcing profile 5.2 of the spacer 5 ends substantially flush with the pane edges of the first pane 1 and the second pane 2. The spacer 5 according to the invention is easy to use since the assembly of the spacer 5 can be carried out without modification of the tools and equipment used such that no investments have to be made when converting production.

FIG. 2 depicts another embodiment of an insulating glazing according to the invention with a reinforcing profile as a counter profile. Unless otherwise described, the insulating glazing of FIG. 2 corresponds to the insulating glazing 20 of FIG. 1*b*, wherein, in deviation therefrom, the reinforcing profile 5.2 has additional legs 5.4, which are extended all the way to the pane contact surfaces 7.1 and 7.2 of the main body 5.1. The legs 5.4 are in each case attached to the reinforcing profile 5.2 at the point of the protrusions 5.3 nearest the glazing interior 3 and extend, starting from them, parallel to the pane contact surfaces 7.1 and 7.2 in the direction of the glazing interior 3. The wall thickness of the reinforcing profile 5.2 is 10 mm in the section of the reinforcing profile parallel to the glazing interior surface 8 of the main body 5.1. The legs 5.4 of the reinforcing profile 5.2 have a wall thickness of 0.5 mm. The polymeric main body 5.1 has recesses 19 on the pane contact surfaces 7.1 and 7.2, into which the reinforcing profile 5.2 is inserted. The barrier film 14 follows the recesses 19 in its course on the outer surface 9 and the pane contact surfaces 7.1, 7.2. The polymeric main body 5.1 has a wall thickness of 1.0 mm. This is also the case in the region of the pane contact surfaces 7.1, 7.2, in which the legs 5.4 rest, wherein, in the region of the pane contact surfaces 7.1, 7.2 which is not covered by the reinforcing profile 5.2, there is a wall thickness of 1.5 mm. The height of the reinforcing profile 5.2 is 6.0 mm in total, of which 2.0 mm is accounted for by the height of the legs 5.4. The reinforcing profile 5.4 according to FIG. 2 further improves the stability of the edge region of the insulating glazing 20 and facilitates the positioning of the reinforcing profile 5.2 on the polymeric main body 5.1.

FIG. 3 depicts the insulating glazing of FIG. 1*b*, wherein in addition to the features described there, on the outer face 16 of the reinforcing profile 5.2, a pressure equalization body 18 is inserted substantially flush on the outer face 16. The pressure equalization body 18 extends from the outer face 16 through the reinforcing profile 5.2, passes through the outer surface 9 of the main body 5.1, and extends into the cavity 10 of the main body 5.1. The pressure equalization body 18 is bonded to and sealed on the outer face 16 of the reinforcing profile 5.2 by means of a sealant 4. The pressure equalization body 18 enables pressure equalization between the glazing interior 3 and the surroundings. This makes it possible to compensate for pressure differences between the production site and the installation site of the glazing and to reduce climate loads. A passage of gas between the surroundings and the glazing interior takes place via a capillary 18.1 and a membrane 18.2 situated in the pressure equalization body 18. The capillary 18.1 is divided into two sections, a capillary section facing the surroundings and a capillary section facing the glazing interior. The membrane 18.2 is inserted between the two capillary sections. The combination of the capillary 18.1 and the membrane 18.2 causes particularly effective control of the air flow and reduces the passage of moisture. The air entering the glazing is first guided into the cavity 10 in which the desiccant 11 situated there absorbs any residual moisture in the incoming air. The air thus dehumidified enters the glazing interior 3 through openings in the glazing interior surface 8. Since the pressure equalization body 18 is already integrated into the reinforcing profile 5.2 of the spacer 5, all additional production steps on the part of the insulating glazing manufacturer for retrofitting a pressure equalization body are eliminated.

FIG. 4 depicts another embodiment of an insulating glazing 20 according to the invention with a flat profile as a reinforcing profile 5.2 and a main body 5.1 with an angled outer surface. The insulating glazing 20 corresponds substantially to the insulating glazing of FIG. 1*b*, wherein, in contrast thereto, the reinforcing profile 5.2 is implemented as a flat profile with a wall thickness of 2 mm. This embodiment is primarily advantageous in terms of simple manufacture of the reinforcing profile 5.2. However, when bonding the spacer 5 to the panes 1 and 2, care must be taken to fill the volumes located between the inner face 15 of the reinforcing profile 5.2 and the angled regions of the outer surface 9 with adhesive 6 and/or sealant 4. This embodiment is particularly suitable for use of adhesives that can be used in liquid form. Advantageously, the adhesive used in FIG. 1*b* can be used. Alternatively, the materials used in the prior art for external sealing, for example, polysulfide, can also be used. This is advantageous in order to offer the insulating glazing manufacturer the possibility of using a spacer having a reinforcing profile even without major conversion of plant technology.

FIG. 5 depicts an embodiment of an insulating glazing 20 according to the invention, which corresponds substantially to the insulating glazing of FIG. 4, wherein, in contrast, the outer surface 9 of the main body 5.1 does not include any angled regions and the reinforcing profile 5.2 is implemented as a flat profile. The glazing interior surface 8, the outer surface 9, the inner face 15, and the outer face 16 run substantially parallel to one another. The spacer 5 of FIG. 5 is simple to produce by using a flat profile as a reinforcing profile 5.2. Moreover, compared to the embodiment of FIG. 4, simplified bonding to the panes 1 and 2 is made possible.

FIG. 6 describes an embodiment of an insulating glazing 20 according to the invention with a U-shaped reinforcing profile 5.2. The insulating glazing 20 of FIG. 6 corresponds substantially to the insulating glazing of FIG. 5, wherein, in contrast, the reinforcing profile 5.2 includes two additional legs 5.4, which extend, starting from the inner face 15 of the reinforcing profile 5.2, in the direction of the glazing interior surface 8 and surround sub-regions of the pane contact surfaces 7.1 and 7.2. The reinforcing profile has a wall thickness of 1.0 mm, which is also present in the region of the legs 5.4. The height of the reinforcing profile 5.2 is 4.0 mm. The polymeric main body 5.1 has, analogous to the embodiment depicted in FIG. 2, recesses 19, into which the reinforcing profile 5.2 is inserted. The legs 5.4 give the reinforcing profile 5.2 improved stability.

FIG. 7 depicts an embodiment of an insulating glazing 20 according to the invention with a U-shaped reinforcing profile 5.2 and a main body 5.1 with a planar outer surface, wherein the legs 5.4 of the reinforcing profile 5.2 point in the direction of the outer interpane space 13. The reinforcing profile has a wall thickness of 1.0 mm, which is also present in the region of the legs 5.4. The height of the reinforcing profile 5.2 is 2.0 mm. The legs 5.4 give the reinforcing profile 5.2 improved stability. Because of the fact that the U-shaped reinforcing profile 5.2 does not embrace the main body 5.1, the recesses 19 can be dispensed with. The reinforcing profile 5.2 is set back laterally in each case by 0.5 mm relative to the pane contact surfaces 7.1 and 7.2. Moreover, the embodiment of FIG. 7 corresponds to the insulating glazing 20 of FIG. 5.

In another possible embodiment, the embodiments of FIGS. 6 and 7 are combined, yielding a reinforcing profile 5.2 in the form of a double-T profile. This has four legs 5.4, with two legs 5.4 engaging in recesses 19 of the polymeric main body 5.1 (analogous to FIG. 6) and two legs 5.4 are directed in the direction of the outer interpane space 13 (analogous to FIG. 7). Such a reinforcing profile has improved stability and an enlarged bonding surface.

In all embodiments depicted in FIGS. 1 to 7, the main body 5.1 and the reinforcing profile 5.2 can optionally be either coextruded or bonded to one another. The barrier film 14 depicted in FIGS. 1 to 7 is merely optional. In particular, in FIGS. 5 to 7, the corners of the polymeric main body 5.1 and/or of the reinforcing profile 5.2 can be rounded.

LIST OF REFERENCE CHARACTERS

1 first pane
2 second pane
3 glazing interior
4 sealant
5 spacer
5.1 polymeric main body
5.2 reinforcing profile
5.3 protrusions of the reinforcing profile
5.4 legs of the reinforcing profile
6 adhesive
7 pane contact surfaces
7.1 first pane contact surface
7.2 second pane contact surface
8 glazing interior surface
9 outer surface
10 cavity
11 desiccant
12 openings
13 outer interpane space
14 barrier film
15 inner face of the reinforcing profile 5.2
16 outer face of the reinforcing profile 5.2
17 side surfaces of the reinforcing profile 5.2
17.1 first side surface of the reinforcing profile 5.2
17.2 second side surface of the reinforcing profile 5.2
18 pressure equalization body
18.1 capillary
18.2 membrane
19 recesses of the polymeric main body 5.1
20 insulating glazing

The invention claimed is:

1. An insulating glazing comprising:

a first pane, a second pane, the first and second panes forming external main surfaces of the insulating glazing, a circumferential spacer comprising at least one polymeric main body and a reinforcing profile, the at least one polymeric main body comprising a glazing interior surface, first and second pane contact surfaces, and an outer surface, the reinforcing body comprising an inner face, an outer face, and first and second side surfaces, the circumferential spacer surrounding an interior space enclosed between the first and second panes, a glazing interior being adjacent the glazing interior surface of the polymeric main body, and an outer interpane space being adjacent the outer surface of the polymeric main body, the outer interpane space corresponding to a peripheral region between the first and second panes outside the interior space, extending from the outer surface of the at least one polymeric main body to an edge region of the first pane and an edge region of the second pane, wherein the first pane is attached to the first pane contact surface via a primary sealant to seal the glazing interior against passage of gas and water, the second pane is attached to the second pane contact surface via another primary sealant, the glazing interior surface of the polymeric main body facing the glazing interior has a planar portion that extends continuously from the first to the second pane contact surfaces, the inner face of the reinforcing profile is materially joined at least in some sections to the outer surface of the at least one polymeric main body and a width of the reinforcing profile is less than or equal to a width of the at least one polymeric main body, and no secondary sealant or gasket that extends the full width of the space from the first pane to the second pane to form an outer seal is located in the outer interpane space such that the outer face of the reinforcing profile constitutes an exposed peripheral surface of the insulating glazing facing an exterior of the insulating glazing.

2. The insulating glazing according to claim 1, wherein the reinforcing profile is materially joined at least in some sections to the at least one polymeric main body by an adhesive and/or a sealant.

3. The insulating glazing according to claim 1, wherein the reinforcing profile is coextruded with the at least one polymeric main body.

4. The insulating glazing according to claim 1, wherein the reinforcing profile is implemented in the form of a counter profile that has a surface complementary to the outer surface of the at least one polymeric main body.

5. The insulating glazing according to claim 1, wherein at least one section of the outer surface of the at least one polymeric main body adjacent the first and second pane contact surfaces is inclined at an angle of 20° to 70° relative to the outer surface in a direction of the first and second pane contact surfaces and the reinforcing profile is implemented as a counter profile, whose inner face enables a flush connection to the outer surface of the at least one polymeric main body and whose outer face runs substantially parallel to the glazing interior surface.

6. The insulating glazing according to claim 1, wherein, along an axis perpendicular to both the first and second pane contact surfaces, the first side surface of the reinforcing profile facing the first pane is set back relative to the first pane contact surface of the at least one polymeric main body by a first distance from i0.0 mm to 1.5 mm in a direction of a surface center of the outer surface and the second side surface of the reinforcing profile facing the second pane is set back relative to the second pane contact surface of the at least one polymeric main body by a second distance from 0.0 mm to 1.5 mm in said direction of the surface center of the outer surface such that the reinforcing profile does not protrude laterally beyond the first and second pane contact surfaces of the polymeric main body.

7. The insulating glazing according to claim 1, wherein a wall thickness of the reinforcing profile is 0.5 mm to 5.0 mm.

8. The insulating glazing according to claim 1, wherein the at least one polymeric main body contains polyethylene (PE), polycarbonates (PC), polypropylene (PP), polystyrene, polybutadiene, polynitriles, polyesters, polyurethanes, polymethyl methacrylates, polyacrylates, polyamides, polyethylene terephthalate (PET), polybutylene terephthalate (PBT), preferably polyethylene terephthalate (PET), acrylonitrile butadiene styrene (ABS), acrylonitrile styrene acrylester (ASA), acrylonitrile butadiene styrene/polycarbonate (ABS/PC), styrene acrylonitrile (SAN), PET/PC, PBT/PC, and/or copolymers or mixtures thereof.

9. The insulating glazing according to claim 1, wherein the reinforcing profile comprises plastics and/or metals.

10. The insulating glazing according to claim 1, wherein a barrier film is attached to the outer surface of the at least one polymeric main body.

11. The insulating glazing according to claim 1, wherein the primary sealant comprises butyl rubber, polyisobutylene, polyethylene vinyl alcohol, ethylene vinyl acetate, polyolefin rubber, copolymers, and/or mixtures thereof, and an adhesive is attached between the first side surface and the first pane and/or the second side surface and the second pane.

12. A method for producing an insulating glazing according to claim 1, comprising:

a) providing a spacer, b) attaching a first pane to the first pane contact surface of the polymeric main body and the first side surface of the reinforcing profile, and attaching a second pane to the second pane contact surface of the polymeric main body and the second side surface of the reinforcing profile, c) pressing the pane assembly to form an insulating glazing.

13. A method comprising providing an insulating glazing according to claim 1 as building glazing or façade glazing.

14. The insulating glazing according to claim 6, wherein the first and/or second distances are from 0.3 mm to 1.2 mm.

15. The insulating glazing according to claim 7, wherein the wall thickness of the reinforcing profile is 0.5 mm to 2.0 mm.

16. The insulating glazing according to claim 8, wherein the plastics comprise polyethylene terephthalate (PET), styrene acrylonitrile (SAN), acrylonitrile butadiene styrene (ABS), acrylonitrile styrene acrylester (ASA), acrylonitrile butadiene styrene/polycarbonate (ABS/PC), styrene acrylonitrile/polycarbonate (SAN/PC), and/or copolymers or mixtures thereof.

17. The insulating glazing according to claim 9, wherein the metals comprise aluminum and/or stainless steel.

18. The insulating glazing according to claim 10, wherein the barrier film comprises one or more polymeric, metallic, and/or ceramic layers.

19. The insulating glazing according to claim 10, wherein the barrier film comprises multiple polymeric layers arranged alternatingly with metallic layers and/or ceramic layers.

20. The insulating glazing according to claim 11, wherein the adhesive is an acrylate adhesive and/or a polyurethane adhesive.

* * * * *